(12) United States Patent
Chang et al.

(10) Patent No.: US 7,414,669 B2
(45) Date of Patent: *Aug. 19, 2008

(54) IMAGE CAPTURING APPARATUS WITH A LASER-FRAMING VIEWFINDER

(75) Inventors: Shan-Wen Chang, Chang-Hua Hsien (TW); Eric Hor, Taipei Hsien (TW)

(73) Assignee: Transpacific Plasma, LLC, Taipei (TW)

( * ) Notice: Subject to any disclaimer, the term of this patent is extended or adjusted under 35 U.S.C. 154(b) by 617 days.

This patent is subject to a terminal disclaimer.

(21) Appl. No.: 10/604,721

(22) Filed: Aug. 13, 2003

(65) Prior Publication Data

US 2004/0246368 A1  Dec. 9, 2004

(30) Foreign Application Priority Data

Jun. 9, 2003  (TW) ............................... 92115606 A (51) Int. Cl.
*H04N 5/225* (2006.01)
*G03B 13/06* (2006.01)
*G03B 13/08* (2006.01)

(52) U.S. Cl. ..................... 348/375; 348/341; 396/382; 396/385

(58) Field of Classification Search ......... 348/373–376, 348/207.99, 532, 137, 169, 370, 341; 396/176–178, 396/373, 378, 380, 383, 385, 429, 431, 106; 352/131; D16/220; 356/3.01, 3.03, 3.05, 356/8, 18

See application file for complete search history.

(56) References Cited

U.S. PATENT DOCUMENTS

| | | | | |
|---|---|---|---|---|
| 5,628,034 A | * | 5/1997 | McIntyre | 396/52 |
| 5,650,817 A | * | 7/1997 | Jae-chon | 348/240.3 |
| 5,666,577 A | * | 9/1997 | McIntyre et al. | 396/296 |
| 5,821,523 A | * | 10/1998 | Bunte et al. | 235/472.01 |
| 6,163,657 A | * | 12/2000 | Emery | 396/431 |
| 6,340,114 B1 | * | 1/2002 | Correa et al. | 235/462.22 |
| 6,668,134 B1 | * | 12/2003 | Niikawa | 386/95 |
| 6,683,651 B1 | * | 1/2004 | Motta et al. | 348/345 |
| 6,724,991 B1 | * | 4/2004 | Chase | 396/375 |
| 6,734,913 B1 | * | 5/2004 | Motta | 348/362 |
| 6,741,809 B1 | * | 5/2004 | Chang | 396/431 |
| 6,809,772 B1 | * | 10/2004 | Motta et al. | 348/341 |

* cited by examiner

*Primary Examiner*—Justin P Misleh
(74) *Attorney, Agent, or Firm*—Workman Nydegger (57) ABSTRACT

An image capturing apparatus with a laser-framing viewfinder includes a housing, a laser source installed inside the housing for generating a laser beam, a first lens installed inside the housing for diverging the laser beam, a framing mask for masking the laser beam diverged by the first lens to form a laser-framing viewfinder, and a camera lens installed in the housing for capturing an object in the laser-framing viewfinder.

22 Claims, 9 Drawing Sheets

IMAGE CAPTURING APPARATUS WITH A LASER-FRAMING VIEWFINDER

BACKGROUND OF INVENTION

1. Field of the Invention

The present invention relates to an image capturing apparatus, and more specifically, to an image capturing apparatus with a laser-framing viewfinder.

2. Description of the Prior Art

Figure 1:
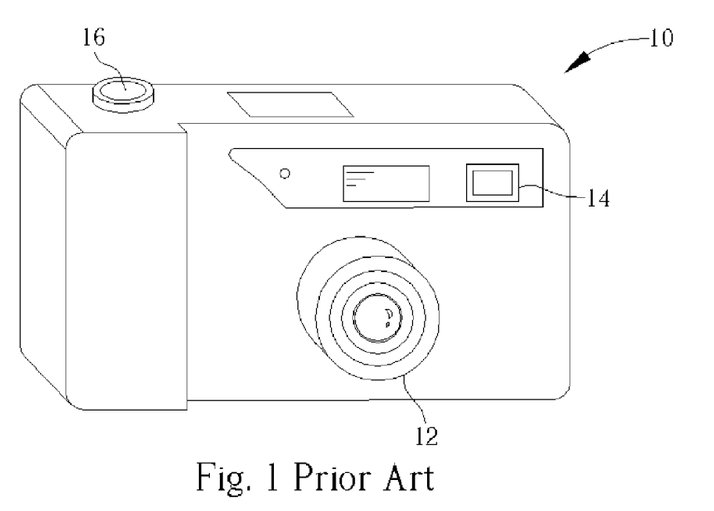
FIG. 1 is a front view diagram illustrating a conventional digital camera.
Figure 2:
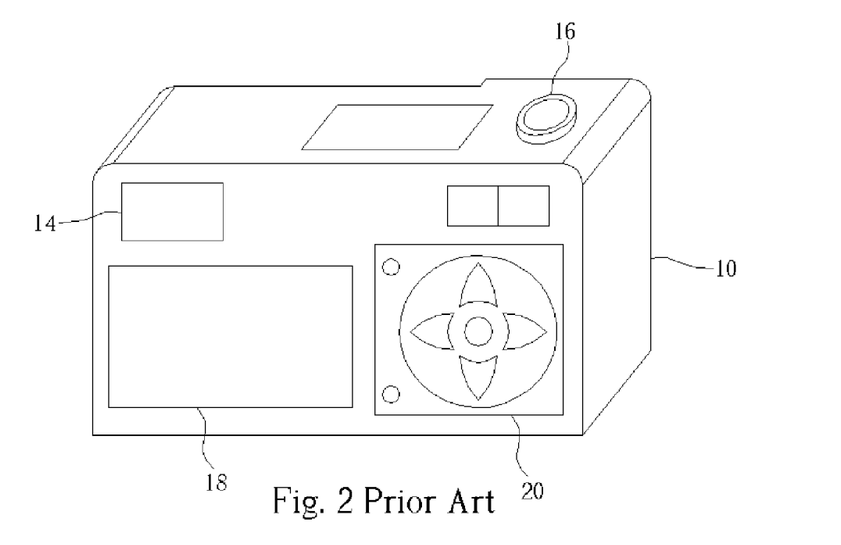
FIG. 2 is a rear view diagram of the conventional digital camera.

Digital cameras have become popular digital products and are positioned to eventually replace conventional film cameras due to low prices and compatibility with other electronic peripherals. Please refer to FIG. 1. FIG. 1 is a front view diagram illustrating a conventional digital camera 10. The digital camera 10 includes a camera lens 12 for capturing an object, an optical viewfinder 14 composed of several lenses for users to view the image of an object refracted by the lenses, and a shutter button 16 for focusing and shooting. Please refer to FIG. 2. FIG. 2 is a rear view diagram of the digital camera 10. The digital camera 10 further includes an electrical viewfinder 18 providing users another option to view the image of the object, which can be a liquid crystal display (LCD) or a low temperature polysilicon (LTPS) display. A control button set 20 is for users to browse and edit images or to set up parameters. The digital camera 10 differs from conventional film cameras by providing the electrical viewfinder 18. Users can view the image of the object on the electrical viewfinder 18 instead of the smaller optical viewfinder 14. In addition, the users can use the electrical viewfinder 18 to browse the images after shooting.

However, the image displayed on the electrical viewfinder 18 is limited by resolution and size and because it is a result of an image signal captured by an image sensor and then processed by a digital signal processor (DSP), distortion when compared to the actual image is observed. Users may discover blurry images due to nonfocusing or hand trembling that is not apparent when shooting them. Moreover, the electrical viewfinder 18 has high power consumption and has a limited angle of view.

Alternatively, users can view the object through the optical viewfinder 14. In this situation users are required to hold the camera close to their face, which is not only inconvenient but also slows down shooting. Additionally, the LCD or LTPS used in the electrical viewfinder 18 costs a significant amount and is not profitable on low-level digital cameras or small-size digital image capturing apparatuses. Thus, there is a need to design a lower cost viewfinder for small-size low-cost digital image capturing apparatuses.

SUMMARY OF INVENTION

It is therefore a primary objective of the present invention to provide an image capturing apparatus with a laser-framing viewfinder to solve the problems mentioned above.

Briefly summarized, an image capturing apparatus with a laser-framing viewfinder includes a housing, a laser source installed inside the housing for generating a laser beam, a first lens installed inside the housing for diverging the laser beam, a framing mask for masking the laser beam diverged by the first lens to form a laser-framing viewfinder, and a camera lens installed in the housing for capturing an object in the laser-framing viewfinder.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
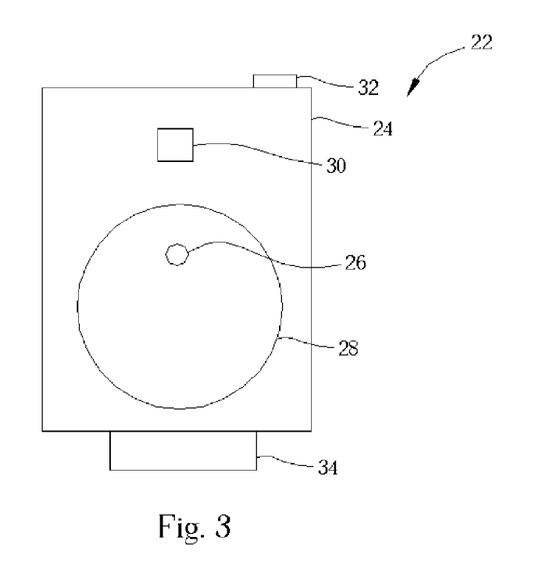
FIG. 3 is a front view diagram of a digital camera according to the present invention.
Figure 4:
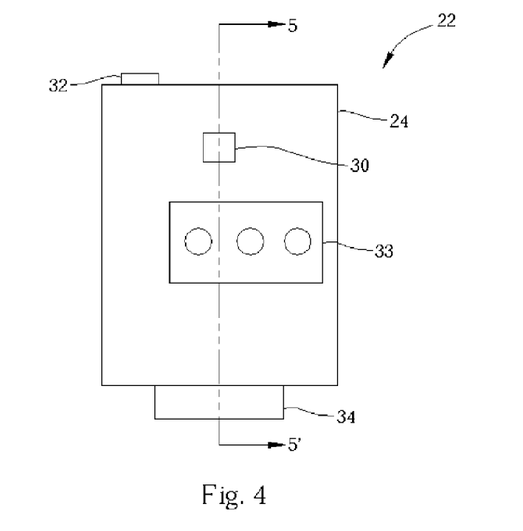
FIG. 4 is a rear view diagram of a digital camera according to the present invention.

Please refer to FIG. 3 and FIG. 4. FIG. 3 is a front view diagram and FIG. 4 is a rear view diagram of a digital camera 22 according to the present invention. The digital camera 22 includes a housing 24, a camera lens 26 for capturing images, a rotating plate 28 installed on the housing 24 for protecting the camera lens 26 from dust and dirt, an optical viewfinder 30 having two viewfinder ports which are installed respectively on the front side and the rear side of the housing 24 for users to view the image of an object. The digital camera 22 further includes a shutter button 32 for focusing and shooting, a control button set 33 for controlling functions of the digital camera 22, and a connecting port 34 for outputting the photo image data, which conforms to the USB1.1, USB2.0, USB OTG or the IEEE1394 standard.

Figure 5:
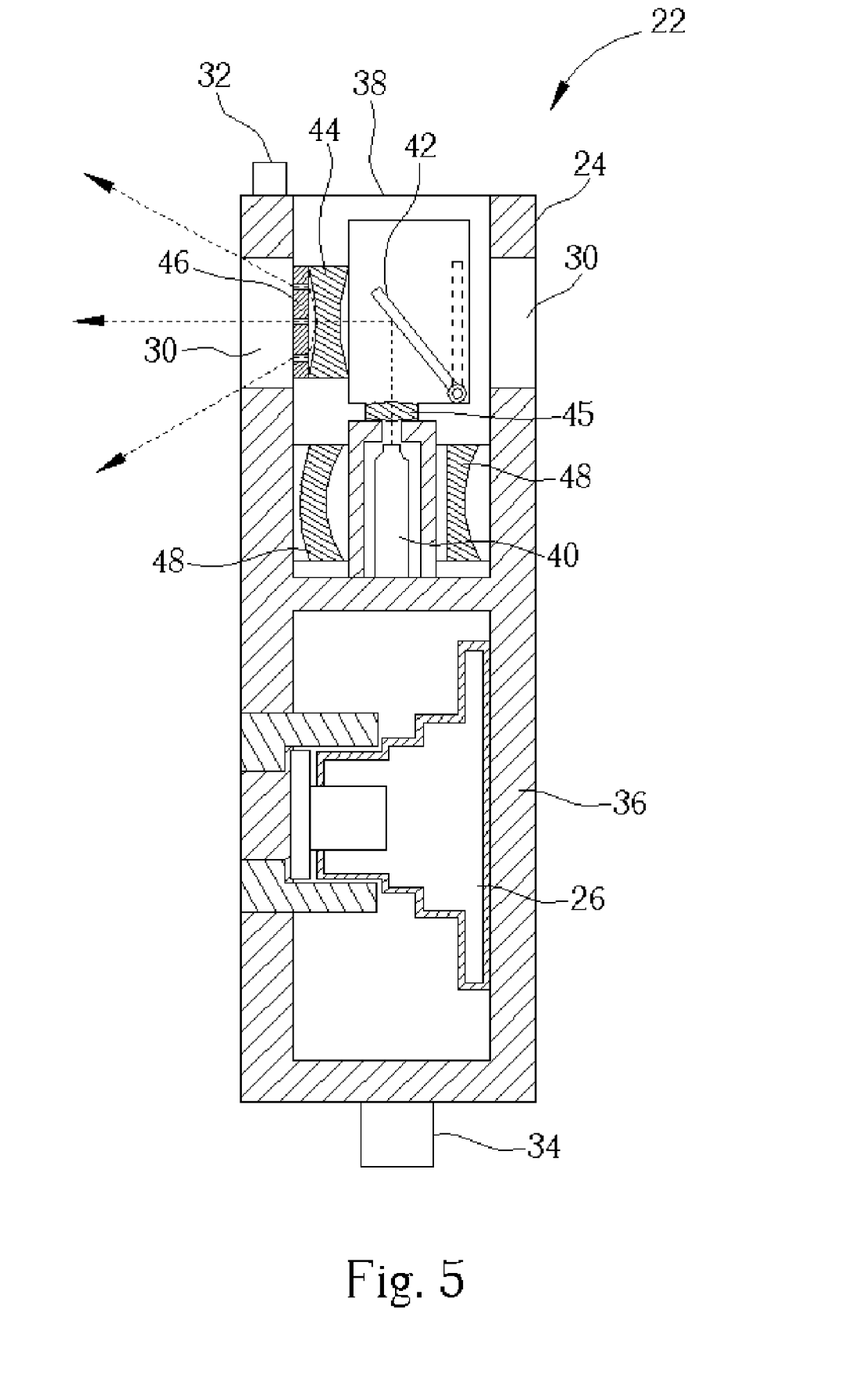
FIG. 5 is a cross section diagram of the digital camera along line 5-5' in FIG. 4.

Please refer to FIG. 5. FIG. 5 is a cross section diagram of the digital camera 22 along line 5-5' in FIG. 4. the housing 24 includes a main body 36 and a sliding set 38 installed on the main body 36. The digital camera 22 further includes a laser source 40 installed inside the main body 36 for generating a laser beam, a reflector 42 such as a plane mirror that is adjustable and installed in the sliding set 38 for reflecting the laser beam generated by the laser source 40, a first lens 44 installed inside the sliding set 38 for diverging the laser beam reflected by the reflector 42, and a third lens 45 positioned above the laser beam 40 for adjusting the laser beam generated by the laser source 40.

Figure 6:
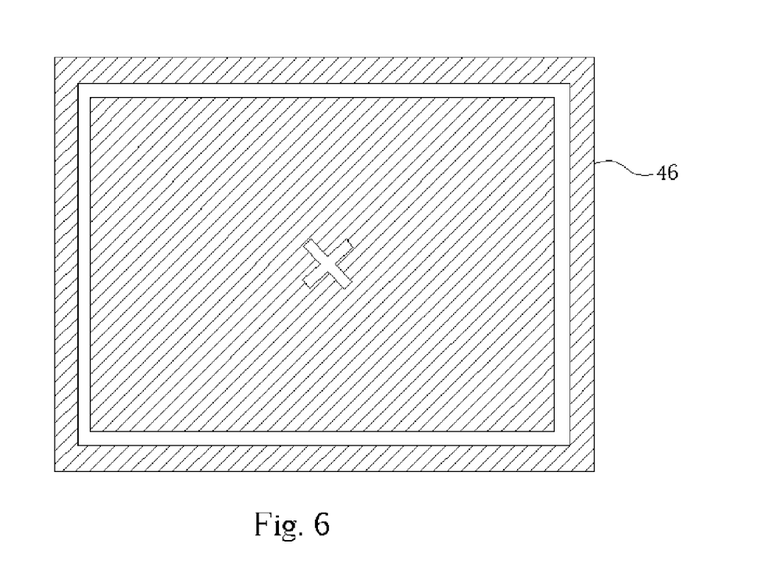
FIG. 6 is a diagram illustrating a framing mask.
Figure 7:
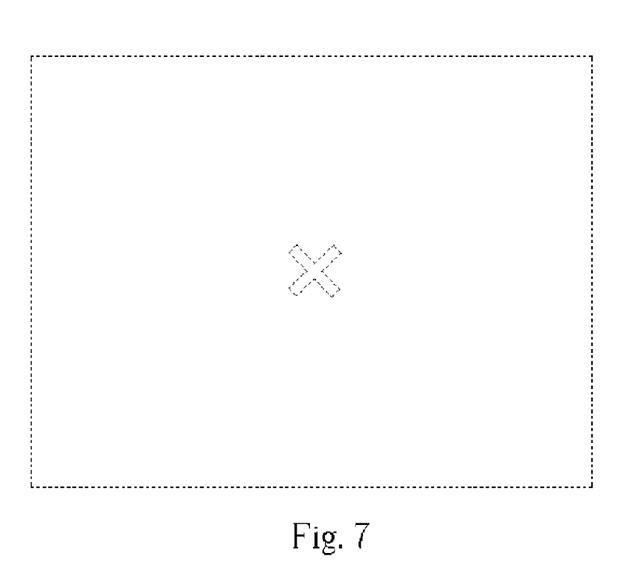
FIG. 7 is a diagram illustrating the laser-framing viewfinder.
Figure 8:
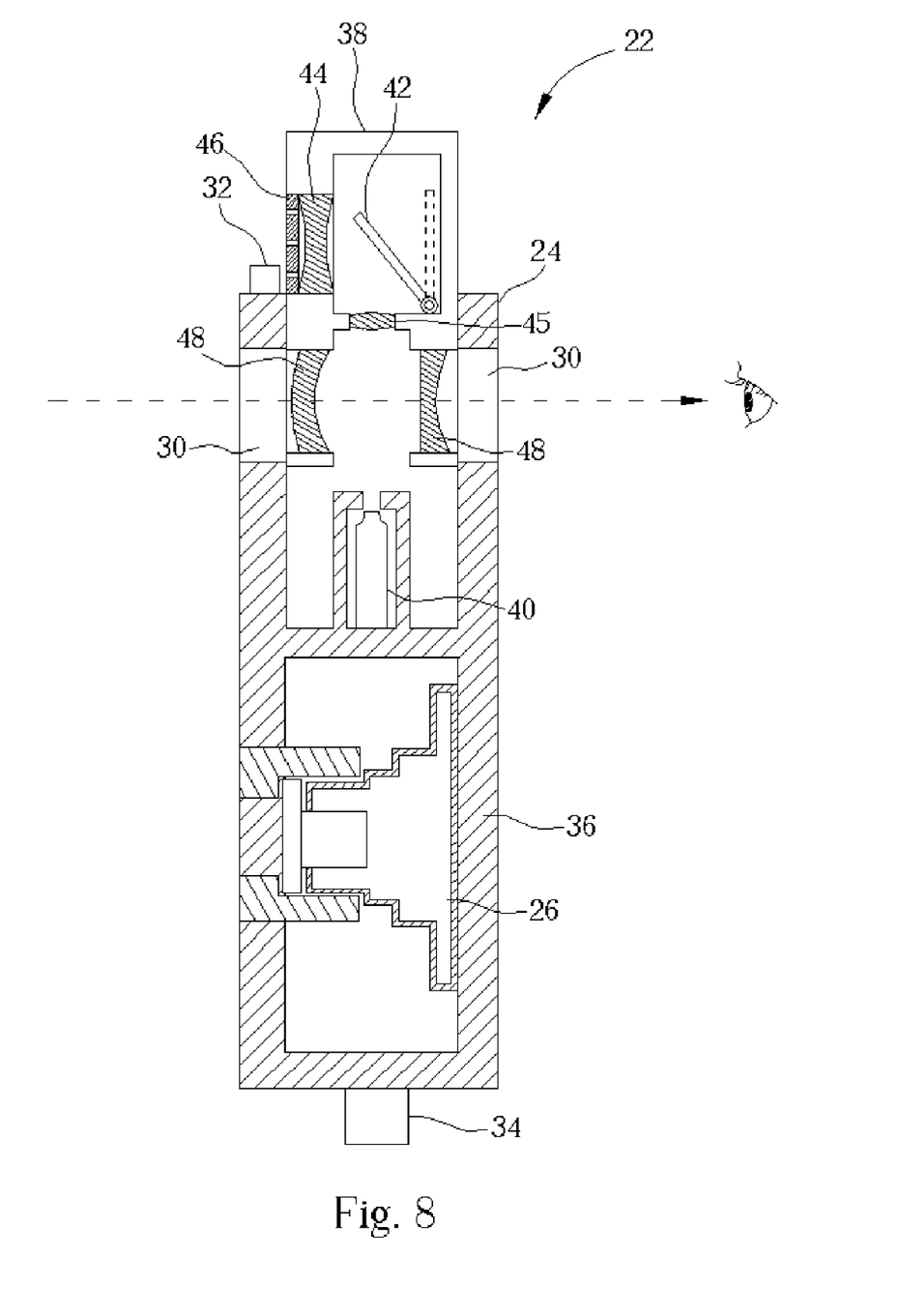
FIG. 8 is a diagram illustrating the sliding set sliding to the upper side.

The digital camera 22 further includes a framing mask 46 installed inside the sliding set 38, which includes shading material for masking the laser beam diverged by the first lens 44 and reflected by the reflector 42 to form a laser-framing viewfinder. Please refer to FIG. 6. FIG. 6 is a diagram illustrating the framing mask 46. The lined area is the shading material and the laser beam can only pass through the clear area of the framing mask 46 to form a shape of a laser-framing viewfinder. Please refer to FIG. 7. FIG. 7 is a diagram illustrating the laser-framing viewfinder formed after the laser beam passes through the framing mask 46. Users can capture an image inside the box marked by the laser-framing viewfinder and the dotted cross in the center is for aiming the center. Designers can determine the shape of the laser-framing viewfinder by modifying the shape of the framing mask 46. The visual angle of the laser framing viewfinder can be configured to be the same to the visual angle of the camera lens 26 by adjusting the combination or the focus of the first lens 44, the third lens 45 and the framing mask 46, in order to have the image in the laser-framing viewfinder be the same to the real image. The digital camera 22 further includes a second lens set 48 installed inside the sliding set 38, which can slide with the sliding set 38 to the position between the two viewfinder ports of the optical viewfinder 30. The second lens set 48 includes a plano-concave lens and a convexo-concave lens, or can be other combinations of lenses. Please refer to FIG. 8. FIG. 8 is a diagram illustrating the sliding set 38 when slid to the upper side. When the sliding set 38 slides upwards in the housing 24, the second lens set 48 slides to a position between the two viewfinder ports of the optical viewfinder 30. The user can view the object through the optical viewfinder 30, and the visual angle of the optical viewfinder 30 can be configured to be the same to the visual angle of the camera lens 26 by adjusting the focus and the combination of the second lens set 48, in order to have the image shown in the optical viewfinder 26 be the same to the real image captured by the camera lens 26.

Figure 9:
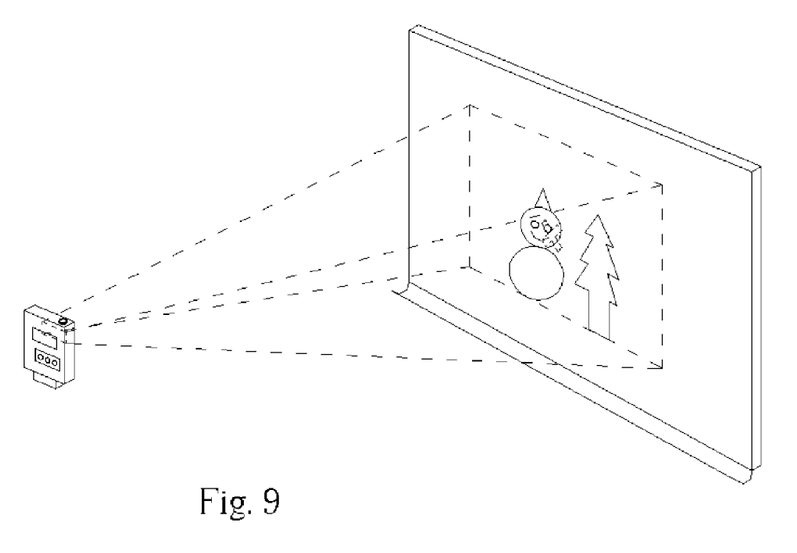
FIG. 9 is a diagram illustrating the digital camera capturing an image through the laser-framing viewfinder.

The operation of the digital camera 22 is as follows. When viewing an image, the user can switch on the laser source 40 using the control button set 33 so that the laser source 40 generates a laser beam. The laser beam passes through and is focused by the third lens 45 and is then reflected toward the first lens 44 by the reflector 42. The angle between the reflector 42 and the laser source 40 can be adjusted according to a required angle of reflection. The laser beam is further diverged by the first lens 44 and directed toward the framing mask 46. The framing mask 46 partially blocks the laser beam to form a laser-framing viewfinder projected around the object. Please refer to FIG. 9. FIG. 9 is a diagram illustrating the digital camera 22 capturing an image through the laser-framing viewfinder. The laser source 40 can be a low power laser generator and can generate laser beams at specific intervals of a time to conserve power used for the laser source 40 and protect the user's eyes from the laser. The laser source 40 of the present invention requires a proper arrangement of time, frequency, and intensity in order to optimize power savings and user safety. When shooting the image, the user presses the shutter button 32 to capture the image, and outputs the shot image data using the connecting port 34 to other peripherals, such as personal computers, notebooks, or printers for image editing or printing.

When an object is too far from the digital camera 22 or no object exists for the laser beam to project a viewfinder box on, the laser-framing viewfinder cannot be used. In this situation, as shown in FIG. 8, it is allowable to slide the sliding set 38 upwards in the housing 24 to move the second lens set 48 to the position between the two optical viewfinders 30, in order to view the object through the optical viewfinders 30. When viewing the object through the optical viewfinders 30, the user can switch off the laser source 40 by the control button set 33 to prevent visual interference with the laser beam. The control button set 33 can be a movable switch, which means that the sliding set 38 presses the control button set 33 when positioned inside the housing 24 to switch on the laser source 40. And when the sliding set 38 slides upwards in the housing 24 as shown in FIG. 8, the control button set 33 is released to switch off the laser source 40. In such a manner the laser source 40 can be switched on and off automatically.

The shutter of the digital camera 22 can be two-staged. The focus can be automatically determined when the user presses the shutter button 32. Automatic exposure and white balance can be switched off in order to prevent the intensity of light from being effected by the laser beam. When the shutter button 32 is pressed at the first stage, the digital camera 22 find the view and focus automatically, and when the shutter button 32 is pressed at the second stage, the image is captured through the camera lens 26, meanwhile the laser source 40 is switched off to prevent from interfering image shooting. If the shot is going to be aborted, the user can release the shutter button 32 at the first stage.

The present invention can be applied on other digital image capturing apparatuses, such as an image capturing apparatus on a notebook or a cellular phone. The application is not limited to digital cameras.

In contrast to the prior art, the present invention provides a laser-framing viewfinder of small size and low cost for image capturing apparatuses to replace conventional electrical viewfinders with high power consumption, high cost, and large size. In addition to these advantages, the laser-framing viewfinder can be used in the nighttime or under a condition of insufficient light that is not possible for conventional optical or electrical viewfinder to operate. And when the laser-framing viewfinder cannot be projected due to the object being too far from the second camera 22 or no object exists, users can slide the second lens set 48 to the position between the two optical viewfinders 30 in order to view the object through the optical viewfinders 30. Thus, the present invention includes optical and laser-framing viewfinders.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image capturing apparatus comprising:
a housing;
a laser source at the housing capable of generating a laser beam; a first lens at the housing capable of diverging the laser beam;
a mask capable of masking the laser beam diverged by the first lens to form a laser-framing viewfinder;
a camera lens at the housing capable of capturing an object in the laser-framing viewfinder;
an optical viewfinder capable of receiving light to view the object being image captured; and
a second lens set at the housing, both the first lens and the second lens set capable of moving relative to the housing and being independently aligned with the optical viewfinder.

2. The image capturing apparatus of claim 1 further comprising a reflector capable of reflecting the laser beam generated by the laser source.

3. The image capturing apparatus of claim 2 wherein the reflector comprises a plane mirror capable of being adjusted.

4. The image capturing apparatus of claim 1 wherein the housing comprises a main body and a sliding set on the main body, and the laser source and the first lens are on the main body and the sliding set respectively.

5. The image capturing apparatus of claim 1 further comprising two optical viewfinder ports capable of receiving light to view the object being image captured.

6. The image capturing apparatus of claim 5 wherein the second lens is on a sliding set capable of sliding to a position between the two optical viewfinder ports.

7. The image capturing apparatus of claim 1 wherein the second lens set comprises a plano-concave lens and a convexo-concave lens.

8. The image capturing apparatus of claim 1 wherein the framing mask comprises shading material.

9. The image capturing apparatus of claim 1 further comprising a connecting port capable of outputting image data.

10. The image capturing apparatus of claim 9 wherein the connecting port conforms to the USB or the IEEE1394 standards.

11. An image capturing apparatus comprising:
a housing comprising a main body and a sliding set movable relative to the main body;
a laser source on the main body capable of generating a laser beam;
a first lens on the sliding set capable of diverging the laser beam;
a framing mask capable of masking the laser beam diverged by the first lens;
an optical viewfinder comprising two viewfinder ports on the main body;
a second lens on the sliding set; and
a camera lens for capturing an object;
wherein when the sliding set is positioned at a first position relative to the main body, the first lens is capable of diverging the laser beam to the framing mask to form a laser-framing viewfinder, and the camera lens is capable of capturing the object in the laser-framing viewfinder, and
when the sliding set is in a second position relative to the main body, the second lens is positioned between the two viewfinder ports of the optical viewfinder, the optical viewfinder is capable of being used for viewing the object, and the camera lens is capable of capturing the object in the optical viewfinder.

12. The image capturing apparatus of claim 11 further comprising a reflector capable of being adjusted inside the housing and reflecting the laser beam generated by the laser source.

13. The image capturing apparatus of claim 12 wherein the reflector comprises a plane mirror.

14. The image capturing apparatus of claim 11 wherein the framing mask comprises shading material.

15. The image capturing apparatus of claim 11 further comprising a connecting port capable of outputting image data.

16. An image capturing apparatus, comprising:
a housing;
means for forming a laser-framing viewfinder;
means for receiving light to view an object being image captured;
means for focusing an image of the object to be viewed through the means for receiving light;
means for selectively moving the means for focusing the image and the means for forming a laser-framing viewfinder so as to be independently aligned with the means for receiving light; and
means for capturing the image.

17. The image capturing apparatus of claim 16, wherein the means for forming the laser-framing viewfinder comprises:
means for diverging a laser beam, and
means for masking the laser beam diverged by the means for diverging.

18. The image capturing apparatus of claim 17, wherein the means for masking the laser beam comprises a framing mask.

19. The image capturing apparatus of claim 17, further comprising a means for reflecting the laser beam generated by the means for generating.

20. The image capturing apparatus of claim 16, wherein the means for receiving light comprises an optical viewfinder disposed on a front and a rear portion of the housing.

21. The image capturing apparatus of claim 16, wherein the means for focusing the image comprises a lens set disposed on a means for sliding.

22. The image capturing apparatus of claim 16, wherein the means for capturing the image comprises a camera lens disposed on the housing.

* * * * *

UNITED STATES PATENT AND TRADEMARK OFFICE
CERTIFICATE OF CORRECTION

| | | |
|---|---|---|
| PATENT NO. | : 7,414,669 B2 | Page 1 of 1 |
| APPLICATION NO. | : 10/604721 | |
| DATED | : August 19, 2008 | |
| INVENTOR(S) | : Chang et al. | |

It is certified that error appears in the above-identified patent and that said Letters Patent is hereby corrected as shown below:

In Column 4, Line 36, after "beam;" a hard return should be implemented, in which Lines 36-37 should read as depicted herein below:

--beam;

a first lens at the housing capable of diverging the laser beam;--

Signed and Sealed this

Eighth Day of September, 2009

David J. Kappos
*Director of the United States Patent and Trademark Office*